United States Patent [19]
Hogg et al.

[11] 3,783,391
[45] Jan. 1, 1974

[54] AXIAL TRAJECTORY SENSOR HAVING GATING MEANS CONTROLLED BY PULSE DURATION MEASURING FOR ELECTRONIC PARTICLE STUDY APPARATUS AND METHOD

[75] Inventors: Walter R. Hogg; Wallace H. Coulter, both of Miami Springs, Fla.

[73] Assignee: Coulter Electronics, Inc., Hialeah, Fla.

[22] Filed: Feb. 8, 1971

[21] Appl. No.: 113,165

[52] U.S. Cl................. 328/111, 328/92, 324/71 PC
[51] Int. Cl. .............................................. H03k 5/20
[58] Field of Search............................ 307/234, 267; 328/111–117, 146, 149; 324/71 PC

[56] References Cited
UNITED STATES PATENTS

| | | | |
|---|---|---|---|
| 2,996,624 | 8/1961 | Mumma....................... | 328/116 UX |
| 3,502,973 | 3/1970 | Coulter....................... | 235/92 PC X |
| 3,548,206 | 12/1970 | Ogle et al. ....................... | 326/116 X |
| 3,553,593 | 1/1971 | Gedance............................ | 328/112 |
| 3,557,352 | 1/1971 | Hogg et al. ....................... | 235/151.3 |
| 3,600,688 | 8/1971 | Booth ................................. | 328/111 |
| 2,704,957 | 3/1955 | Miessner............................. | 84/1.15 |
| 2,968,011 | 1/1961 | Schouten et al...................... | 333/20 |
| 2,996,624 | 8/1961 | Mumma............................... | 250/218 |
| 3,255,293 | 6/1966 | Walker ................................ | 84/1.10 |
| 3,289,195 | 11/1966 | Townsend........................... | 340/324 |
| 3,399,311 | 8/1968 | Andrea............................... | 307/225 |
| 3,454,792 | 7/1969 | Horlander.......................... | 307/261 |

Primary Examiner—John W. Huckert
Assistant Examiner—B. P. Davis
Attorney—Silverman & Cass

[57] ABSTRACT

A sensor for use with apparatus operating in accordance with the principles of the Coulter electronic particle studying device, for discriminating between signals from particles passing on axial or near axial paths through an aperture and particles passing off center on the basis of their differing durations. The pulse duration of a portion of the pulse is measured and only those which meet the criteria of duration established by the electronic circuitry are permitted to pass for use in pulse height analysis apparatus following the sensor. The other pulses are discarded on the basis of their greater durations. The apparatus provides structure for deriving a duration-measuring pulse whose duration extends in one case from the peak of a particle pulse to a fractional amplitude thereof, and in another case from the time of maximum slope of the leading edge to the time of maximum slope of the trailing edge. In each case the duration-measuring pulse is converted into a signal which has an amplitude proportional to duration and the latter signal is compared with a certain maximum signal level to operate gating means for rejecting the longer duration pulses and passing the shorter duration ones. Multiple peak pulses are also discarded by means of suitable circuitry.

36 Claims, 7 Drawing Figures

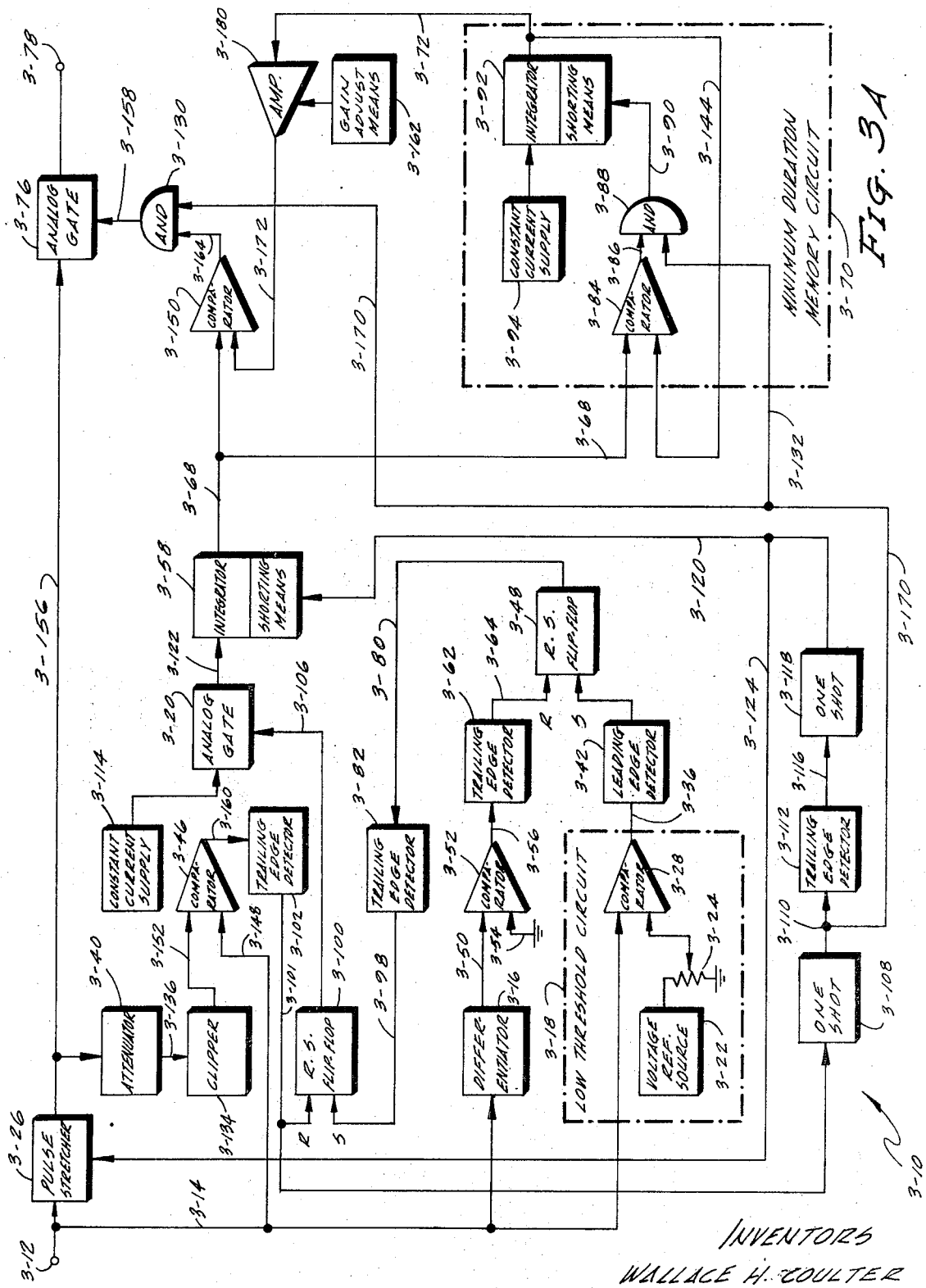

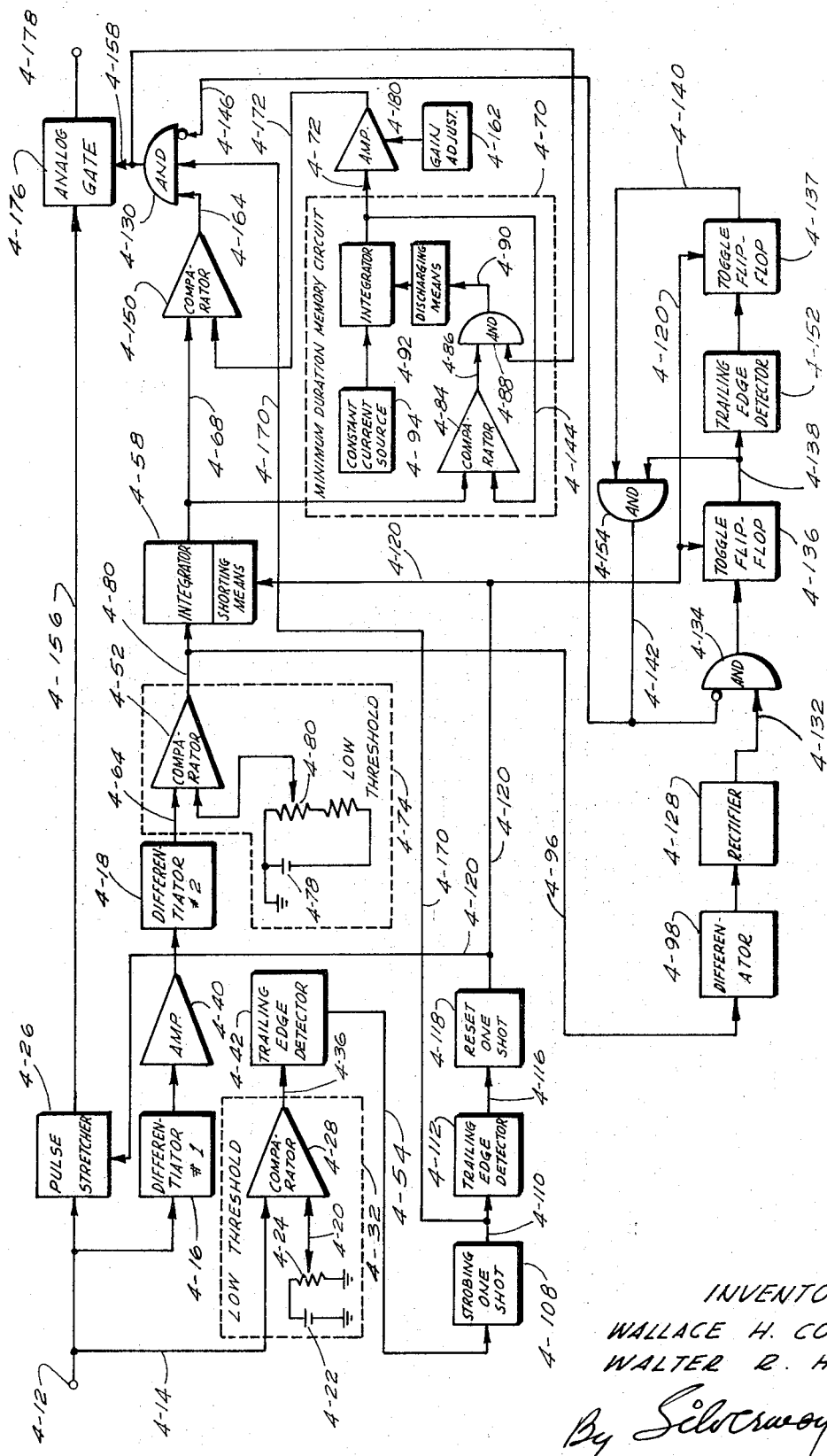

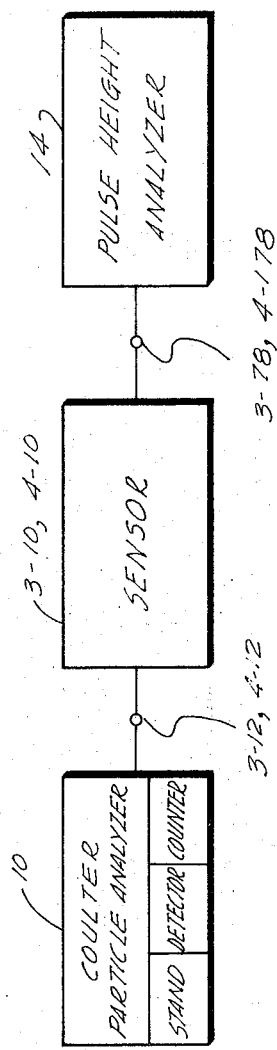

AXIAL TRAJECTORY SENSOR HAVING GATING MEANS CONTROLLED BY PULSE DURATION MEASURING FOR ELECTRONIC PARTICLE STUDY APPARATUS AND METHOD

CROSS REFERENCE TO RELATED APPLICATIONS

This application is concerned with modified forms of the inventions disclosed in co-pending applications having the same title as this application Ser. Nos. 84,440 and 101,325, filed respectively on Oct. 27, 1970 and Dec. 24, 1970, one of the applicants herein being the applicant in both of said co-pending applications, and all of the applications being assigned to the same assignee.

BACKGROUND OF THE INVENTION

The field of this invention is particle analyzing apparatus and more particularly is concerned with apparatus in which studies may be made of particulate systems using the Coulter sensing principle in a manner to obtain more accurate size information than heretofore achieved.

The Coulter sensing principle is disclosed in U.S. Pat. No. 2,656,508 issued Oct. 20, 1953 to Wallace H. Coulter. According to this principle, when a microscopic particle in suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U.S. Pat. No. 2,656,508 has been used to count and size particles in biological fluids, industrial powders and slurries, etc.

The principles of the present invention apply to Coulter particle analyzing apparatus in which the excitation of the field is achieved by means of unidirectional or low frequency power sources or radio frequency power sources.

In commercial versions of the Coulter particle analyzing apparatus, the electric field of small dimensions has been formed commonly by a microscopic right cylindrical passageway or aperture, as it is known, between two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary changes in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between different pulse amplitudes, one can make size studies. This invention is primarily concerned with size studies, and has, as a very important object thereof, the provision of apparatus which will enable highly accurate particle size data to be achieved.

It has been known that "long" apertures can produce results which are superior to short apertures insofar as size measurements are concerned, if the bandwidths of the associated amplifiers are reduced accordingly. A long aperture may be considered one in which the length is greater than the diameter. The usual Coulter aperture is relatively short, that is, its length is the same as or less than its diameter.

The reason for better size information with long apertures is that the electrical field halfway through the aperture, being the position most remote from the entrance and exit of the aperture, is most uniform and has the most uniform current distribution for all paths through the aperture. The longer the aperture, the more nearly uniform is the field at this midpoint. At the entrance and exit of the aperture, the current density is greater at the edges of the aperture and correspondingly lesser on the axis of the aperture. This may be explained by pointing out that current paths other than the axial path are supplied from the sides of the aperture as well as straight ahead. The lower current density on the axis at the entrance and exit results in a lower instantaneous signal than is the case for particles entering the aperture and leaving it on other paths. In other words, the current density at the corners of the aperture is greater than at the axis.

Another phenomenon is important to consider, according to this invention. The velocity of electrolyte flow, and hence the velocity of particles also, is somewhat greater on an axial path than on paths closer to the edges of the aperture or paths which are off-center, because the liquid does not have to change direction when it goes through the axial center of the aperture. The resistance to flow is a minimum on the axis since it is surrounded by a moving sheath of liquid having substantially the same velocity.

The prior art has recognized the problem involved in the use of the Coulter apparatus for sizing studies, but so far as is known, there has been no satisfactory solution. One attempt involved releasing the particles in a suspension from a focussed source ahead of the aperture; but this involved the use of two apertures and the inability to illuminate and view the aperture during the process.

The use of long apertures poses too many problems to make the same practical. The long aperture has less sensitivity. It adds resistance to the effective aperture which generates noise tending to mask the signals. Microphonic modulation of the aperture is also increased. The long aperture is more likely to have coincident particles in it, giving rise to counting and sizing errors. The long aperture is more likely to become blocked by debris and is not as easy to clear as a short aperture. The flow rate of long apertures is decreased because of increased resistance to flow, thus decreasing the time for making any given studies.

The problems referred to above are solved by the basic invention which is disclosed in various forms in the said co-pending applications. The invention of this application relates to forms of the basic invention which are directed to economies in circuitry by eliminating some of the more expensive components used in the circuits of the co-pending applications.

The invention herein also attacks the problem of processing pulses whose leading and trailing edges are not well-defined and discriminating against pulses which have multiple peaks. In the latter case, the multiple peak signifies a pulse produced by a particle which passed through two locations of high current density while traversing the aperture. Its amplitude is anomolous and hence not proportional to the size of the particle.

SUMMARY OF THE INVENTION

According to the invention, particles passing through an aperture are examined electronically to ascertain which of them passed most nearly on axial paths through the aperture. These are the only particles which are permitted to be regarded by the apparatus, the others being disregarded. The electronic selection is based on the fact that the particles following axial paths spend the least time in the ambit of the aperture, and therefore their corresponding pulses have the shortest duration. Ideally, all pulses passing through the aperture, regardless of size, will have the same duration; but because of the reasons given above, this is not practically true. Pulses due to particles which pass through the aperture off-center will normally have longer durations.

By disregarding a percentage of the pulses, fewer are considered by the pulse height analyzing equipment which follows the sensor of the invention, resulting in a slight degradation in the statistical accuracy if a given amount of sample of a given concentration is scanned. The data which are achieved, however, are of much higher quality. If a count is required, this is made before the signals are processed in the sensor of the invention.

The particle pulses are examined by ascertaining their durations from the first peak of the pulse to some fraction of its amplitude. The peak is found by differentiating the particle pulse once and choosing the point at which the resulting signal passes through zero. This signifies zero slope or the peak of the particle pulse. The resulting measuring signal is then converted into a pulse whose amplitude is proportional to the duration of the measuring signal. This amplitude is then compared with certain signal level criteria to ascertain whether the original particle pulse was of a size to be passed to the pulse height analyzing equipment or to be disregarded.

In another version of the invention the pulses are differentiated twice resulting in a wave or signal representing rate of change of slope. At maximum slope the rate of change of slope is zero and hence the signal crosses the base line for each point of inflection of the leading and trailing edges of the particle pulse, i.e., where the pulse shape changes from concave to convex, and it is processed in the same manner as the duration-measuring pulse described above. Additionally, means are provided to reject any pulses which produce more than two zero crossings of the base line since this will clearly result when the particle pulse has more than one peak.

BRIEF DESCRIPTION OF THE DRAWINGS

FIG. 3A is a block diagram of an axial trajectory sensor constructed in accordance with the invention;

FIG. 4A is a block diagram of an axial trajectory sensor of a modified form;

FIG. 5 is a block diagram of a system constructed in accordance with the invention and using an axial trajectory sensor.

DESCRIPTION OF THE PREFERRED EMBODIMENTS

Figure 1:
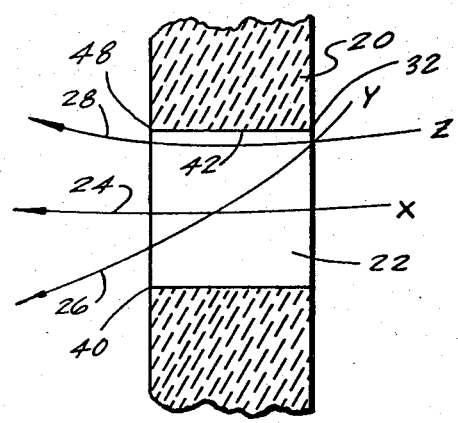
FIG. 1 is a diagrammatic view of the aperture of a Coulter particle analyzing apparatus showing the paths of different particles through the apparatus.

The basic concept of this invention is common to the two co-pending applications and like them is based upon a practical consideration of the electric pulses which result when a suspension of particles is passed through the aperture of a Coulter electronic particle analyzing device. As explained in the co-pending applications, particles which pass through the aperture substantially along the axis thereof will produce electric pulses whose durations are quite closely the duration of the particle within the practical ambit of the aperture, and will produce electric pulses whose amplitudes are quite closely proportional to the sizes of the respective particles producing the same.

Since the practical aperture of the Coulter device is formed in a wafer of some hard material such as corundum, the techniques of manufacture result in apertures with generally sharp entrances and exits. Such apertures are also more desirable than those which have rounded entrances and exits since they do not as readily clog with debris, and if clogged are more easily cleared than the rounded entrance ones.

Particles which pass through the ordinary Coulter aperture off center will produce electric signals which have durations longer than those which pass through the aperture on center. They may additionally have multiple peaks and amplitudes which are either anomalous or not proportional to the respective sizes of the particles which cause the same.

The reasons for the phenomena above-mentioned are stated in some detail in the said co-pending applications but will be discussed very briefly here. The speed of the flow in the center of the aperture is greater than off center. Along the walls of the aperture with sharp entrances and exits there is a slower flow which slows down the passage of particles and hence their durations of passage as well as the durations of their electric pulses will be greater than those of particles passing through the center of the aperture. Additionally, there are locations of high current density in the vicinities of the corners which may produce peaks in the resulting particle pulses. Normal electronic circuitry is not capable of ascertaining without error that instantaneous value of a multiple peak pulse which truly represents the amplitude that is proportional to size.

Like the inventions of the co-pending application, the function of the invention herein is to accept pulses of the shorter durations and discard pulses of the longer duration. The object of improving the quality of the pulses is to make analyses of the particle sizes; hence, if any counting is to be done, this is accomplished prior to the introduction of the particle pulses to the sensor of the invention.

The sensor of this invention differs from those of the co-pending applications in that circuitry is used which eliminates the most expensive components of the others. Additionally, circuitry is disclosed which discards any pulses which have more than one peak, irrespective of their duration.

A system constructed in accordance with the invention is illustrated in FIG. 5. The block 10 comprises a Coulter particle analyzing apparatus which is normally composed of a stand, detector and counter. The stand includes the vessels, aperture tube, fluid system and electrodes of the apparatus. The detector includes circuitry which produces the particle pulses. The counter may be any device which responds to the particle pulses, and may include pulse height discriminating means. It may be omitted in instances where only size studies are to be made, but is shown in order to point out that since the sensor 3-10 will be discarding many pulses, it is best to make any counts prior to applying the particle pulses to the sensor 3-10. As seen, from the sensor 3-10, the output signals at 3-78 are applied to some form of pulse height analyzer 14 in order to make the sizing studies.

FIG. 1 is a diagrammatic view of an aperture which constitutes the scanning means in the stand of Coulter electronic particle device 10, immersed in a liquid and having particles passing through the aperture of the wafer. Thus, the wafer is designated 20, and the aperture itself is designated 22. The sample liquid is passing through the aperture 22 from right to left, and as it moves, it carries the particles in suspension with it. The paths of three particles, X, Y, and Z, are illustrated at 24, 26, and 28, respectively. These paths are deliberately chosen to be considerably different, for purposes of illustration, and the signal or particle pulses which are produced as a result of such passage are shown on the identical time base in FIG. 2 at graphs X, Y, and Z.

The particle X passes almost coaxially of the aperture 22 along the path 24. The speed of the liquid passing through the aperture at this point is maximum and the current density distribution along the path is most predictable. Accordingly, the resulting pulse 30 in FIG. 2, as shown in the curve X is a simple bell-shaped pulse whose duration is proportional to the length of the aperture 22 from $t_1$ to $t_2$ and whose amplitude is quite closely proportional to the size of the particle. Although the amplitude will be considered as voltage, it should be understood that pulses and signals could also be current waves.

The particle Y passes through the aperture 22 on a diagonal path 26. In the first place, it will be appreciated that its path, while traversing the aperture, is longer than the path 26 because it is at an angle. In the second place, at the point where it entered the aperture, this being a corner at 32, the current density is much higher than that closer to the axis of the aperture. Accordingly, the beginning of the pulse 34 which is produced by this particle, will have a higher amplitude, and will also probably commence slightly before the pulse 34. If it commences at practically the same time $t_1$, due to its time within the aperture being longer, it will finish later than the time $t_2$. As shown, there is a peak at 36 due to the effect of high current density at the corner 32, and a lesser peak at 38 which is produced when the particle leaves the aperture, since it is approaching the high current density at the corner 40.

The particle Z goes through the aperture 22 on a relatively straight line, but in this case it is quite close to the wall 42 of the aperture. The resulting pulse 42' has two peaks, one at 44 caused by the corner 32 with its high current density, and the other at 46 caused by the particle passing the high current density corner 48. In this case, the particle will remain in the aperture longer than the time $t_1$ to $t_2$ because the speed of flowing liquid is less adjacent the wall than it is in the center of the stream. This is a well-known phenomenon of flow of liquids through orifices.

In these three cases, it can be seen that the only pulse which is most truly representative of the size of the particle is that which passes through the center of the aperture 22, namely, the particle X. According to the invention, circuitry is provided to discard pulses of the other types, based upon their time duration, since it becomes clear that only the pulses of shorter duration have gone through the center of the aperture and produced the most representative wave shapes.

Figure 2:
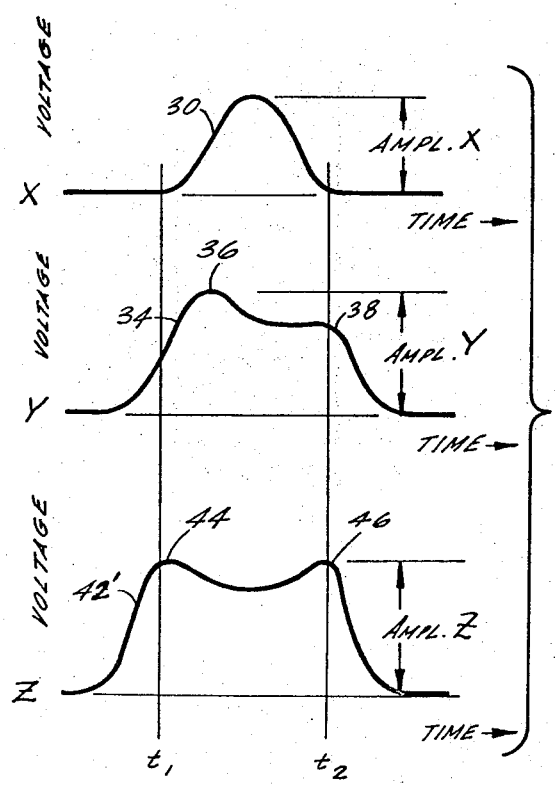
FIG. 2 is a diagram showing the graphs of particle pulses resulting from the passage of the particles of FIG. 1 along the paths shown through the aperture.

According to the invention, structure is provided to discriminate between different types of pulses which are illustrated in the graphs of FIG. 2. The basis for duration discrimination in the apparatus which is described in connection with the circuits detailed herein is analog in nature, although as explained in the first of the co-pending applications, such basis could as well be digital. The structure which is described hereinafter for use in duration discrimination is substantially identical to that used in the second of the co-pending applications, and obviously other means could be used. The structure which is described hereinafter to discriminate against particle pulses which have more than one peak is somewhat digital in nature and is used along with a gating signal based also upon duration discrimination, although it could be used alone under certain circumstances.

Figure 3B:
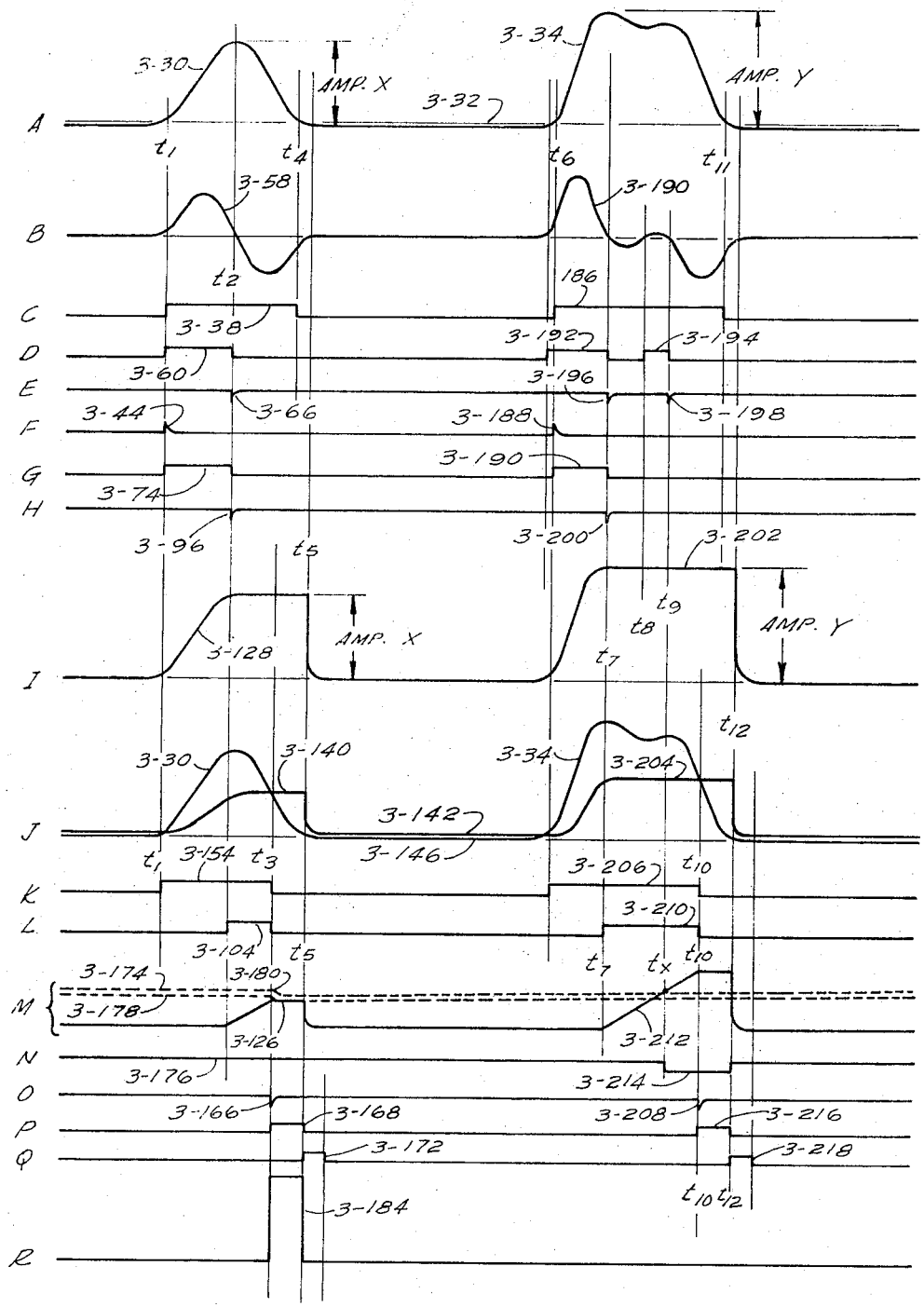
FIG. 3B is a diagram consisting of a series of graphs all on the same time scale illustrating various wave shapes throughout the sensor of FIG. 3A resulting from the processing of two particle pulses therein.

The block diagram of FIG. 3A illustrates an axial trajectory sensor which utilizes the basic concept of the invention and those of the co-pending applications and, in addition, is constructed in accordance with the invention to achieve the purpose alluded to above. Its primary attributes are simplicity and economy. For the purposes of the explanation, it is assumed that two particles are being examined, and their particle pulses are being processed in the sensor of FIG. 3A. These are the particles X and Y of FIGS. 1 and 2 and the resulting wave shapes derived from the pulses throughout the circuit are illustrated in FIG. 3B, all on the same time base.

The apparatus of FIG. 3A is designated generally 3-10 and is characterized by the provision of means to discriminate between pulses of different durations, on the basis of which the desired pulses are chosen and permitted to pass through the apparatus in the form of rectangular signals, the amplitudes being the same as the respective particle pulses causing the same, and all durations being the same. The particular discriminating means used in the apparatus of FIG. 3A and as well in the apparatus of FIG. 4A is substantially disclosed in the second of the co-pending applications. It is automatic in that the pulses themselves control the level of voltage representing a maximum duration against which the durations of the respective particle pulses are measured. Additionally, the apparatus 3-10 produces its duration-measuring signal from the time that a particle produced pulse reaches its first peak to the time that it subsides to a predetermined fraction of its amplitude, chosen to be 50 percent in the particular example.

The incoming particle pulses such as 3–30 and 3–34, shown in graph A of FIG. 3B, are applied to the input terminal 3–12 and from this point are applied to the pulse stretcher 3–26 and by way of the line 3–14 to the differentiator 3–16, the comparator 3–28 of the low threshold circuit 3–18 and to the comparator 3–46.

The differentiator 3–16 differentiates the signal 3–30 and produces at its output 3–50 a signal 3–58 shown in the graph B of FIG. 3B. Initially the progress of the particle X will be examined as its pulse 3–30 is processed by the sensor 3–10.

The low threshold circuit 3–18 comprises the voltage reference source 3–22, the potentiometer 3–24 and the comparator 3–28. The low level threshold voltage is chosen to suppress noise, is slightly above the base line of the incoming signals and is shown at 3–32 of graph A of FIG. 3B. When the signal 3–30 arrives, at the time $t_1$, close to the beginning of the pulse, it exceeds the low threshold voltage 3–32 and an output is produced on the line 3–36 from the comparator 3–28 which comprises the rectangular wave 3–38 of graph C of FIG. 3B. The wave 3–38 persists so long as the signal 3–30 exceeds the low threshold 3–32 and hence lasts until the time $t_4$. The beginning of the rectangular wave 3–38 occurs at the time $t_1$. The leading edge of the wave 3–38 is sensed by the leading edge detector 3–42 to produce the trigger spike 3–44 at the time $t_1$ shown in the graph F of FIG. 3B. This trigger spike 3–44 is used to set the RS flip-flop 3–48. The purpose of this component will be described below.

The output of the differentiator 3–16 comprising the signal 3–58 is applied by way of the line 3–50 to the comparator 3–52. It will be seen that the second terminal input of the comparator 3–52 is grounded as shown at 3–54 so that the only output from the comparator 3–52 appearing at the line 3–56 will occur while the input on the line 2–50 is positive. The output of the comparator 3–52 therefore consists of a rectangular wave 3–60 shown in graph D of FIG. 3B which is produced only for that portion of the signal 3–58 which is positive.

At this point, the significance of the rectangular wave 3–60 should be examined. Since the original particle pulse 3–30 is applied to the differentiator 3–16, the output signal 3–58 is a graph of the slope of the pulse 3–30. The slope of the leading edge of the pulse 3–30 increases from the base line until it is a maximum at about the center of the rise, after which it decreases until at the peak the slope is zero. Thus, the wave 3–58 has a peak in about the center of the rise of the leading edge of the pulse 3–30, then decreases to zero which is the time that the peak of the pulse 3–30 is reached. Thereafter, the slope becomes negative and a waveform similar to the first half of the wave 3–58 is generated, but below the base line since the slope is negative. The crossing of the base line at the time $t_2$ thus very accurately establishes the peak of the pulse 3–30, and when the rectangular wave 3–60 is generated, its trailing edge occurs at the exact time of the peak of the pulse 3–30. Passing the signal 3–60 through a trailing edge detector 3–62, there is derived on the line 3–64 as the input to the reset terminal of the RS flip-flop 3–48 a trigger pulse 3–66 which establishes also the exact time that the peak of the pulse 3–30 occurs. As stated, this is at the time $t_2$.

The effect of the trigger spike 3–66 is to reset the RS flip-flop 3–48, it being recalled that the trigger spike 3–44 set the RS flip-flop at the time $t_1$. As will become apparent from the description that follows, the RS flip-flop 3–48 permits the sensor 3–10 to respond only to the first peak of any incoming particle pulse, it being assumed that any multiple-peaked pulses will be rejected on the basis of duration.

The output of the RS flip-flop 3–48 appears at the line 3–80 and comprises a rectangular wave 3–74 shown at the graph G or FIG. 3B. This pulse is applied to the trailing edge detector 3–82 whose output then provides the trigger spike 3–96 of graph H of FIG. 3B which, in turn, is applied to the set input of the RS flip-flop 3–100. The output of the RS flip-flop 3–100 starts at the time $t_2$ which marks the exact instant that the peak of the pulse 3–30 is reached, and continues as a rectangular wave 3–104 of graph L of FIG. 3B until the flip-flop is reset. The reset signal consists of a signal appearing at the reset terminal of the RS flip-flop 3–100 derived from the trailing edge detector 3–102 on the line 3–101. The rectangular wave 3–104 commences at the time $t_2$ and ends at the time $t_3$.

The pulse 3–104 is used to open the analog gate 3–20 to which the RS flip-flop 3–100 is connected by the line 3–106. When the analog gate 3–20 is turned on, current from the constant current supply 3–114 commences to flow into the integrator 3–58 by way of the line 3–122. This commences the production of a ramp and plateau pulse 3–126 shown in graph M of FIG. 3B, with the ramp portion being produced by the flow of current and so long as the current is flowing. This means that the amplitude of the plateau portion will be proportional to the duration of the pulse 3–104, or proportional to the duration of time measured between $t_2$ and $t_3$. It has already been explained that $t_2$ is the instant that the peak of the pulse 3–30 occurs, and the following explanation will show the derivation of the time $t_3$.

The pulse 3–30 was also applied to the pulse stretcher 3–26, and the stretched pulse resulting is the pulse 3–128 of the graph I of FIG. 3B appearing on the line 3–156 and at the input to the attenuator 3–40. The pulse 3–128 has an amplitude which is the same as the pulse 3–30, namely, the amplitude X, but the circuit retains the voltage level reached by the leading edge of the pulse 3–30 and thus produces a plateau of constant amplitude until the condensers in the circuit are discharged. The stretched pulse 3–128 is attenuated in the attenuator 3–40 to some amplitude which is a predetermined fraction of the amplitude X, chosen in this case to be 50 percent. The output of the attenuator 3–40 appears at the line 3–136 and consists of the signal 3–140, shown in graph J of FIG. 3B. The flat-topped pulse 3–140 is passed to the clipper 3–134 on the line 3–136. This prevents the voltage of the pulse 3–140 from decreasing to ground reference. Instead, it remains at the level 3–142 between pulses such as 3–140, slightly above the base line 3–146. The purpose of this is to ensure that between pulses the voltage at the path 3–148 will be below the voltage on the path 3–152.

The output of the clipper 3–134 appears on the line 3–152 which is one of the terminals of the comparator 3–46, the other terminal having the original particle pulse 3-30 thereon. This is shown with the two waves 3-140 and 3-30 superimposed in graph J of FIG. 3B. The two signals are compared, and the comparator 3-46 produces an output of constant amplitude for the time that the pulse 3-30 exceeds the signal 3-140. This occurs from slightly after the time $t_1$ to the time $t_3$ and the resulting wave 3-154 appears on the line 3-160 and is shown in the graph K of FIG. 3B. From the comparator 3-46 the signal 3-154 is applied to the trailing edge detector 3-102, this detector producing a trigger spike 3-166 shown in graph O of FIG. 3B. The trigger spike 3-166 appears on the line 3-101.

Considering the processing of the pulse 3-30 through the pulse stretcher 3-26, attenuator 3-40, clipper 3-134, comparator 3-46 and the trailing edge detector 3-102, it will be noted that the time $t_3$ which is that time at which the trigger spike 3-166 appears is the instant that the particle pulse 3-30 has subsided to the fractional amplitude chosen by the attenuator 3-40, in this case 50 percent of its original amplitude X. This part of the pulse is on its trailing edge.

In review, we now have two trigger pulses 3-96 and 3-166 which respectively occur at the instant that the pulse 3-30 reaches its peak and the instant that it subsides to 50 percent of its amplitude X. It has been explained that the trigger spike 3-96 sets the RS flip-flop 3-100 to start the rectangular wave 3-104, and now it can be seen that the trigger spike 3-166 is applied to the reset terminal of the flip-flop 3-100 so that the rectangular wave 3-104 is terminated at the time $t_3$. The duration of the rectangular wave 3-104 from the time $t_2$ to the time $t_3$ is the duration of the pulse 3-30 from its peak to the half amplitude of its trailing edge. The rectangular wave 3-104 produces the output 3-126 from the integrator 3-58, this being a ramp and pedestal wave 3-126 of graph M previously described. The length of the pedestal or plateau is determined by the time when the shorting means of the integrator 3-58 is energized to reset the integrator to its minimal charge condition. The trigger spike 3-166 is applied by the line 3-101 to the one-shot multivibrator 3-108 which commences to produce a rectangular pulse 3-168 at the time $t_3$. This pulse is shown at graph P of FIG. 3B.

The rectangular pulse 3-168 is applied at 3-110 to the trailing edge detector 3-112 and by way of the line 3-170 to the AND gate 3-130 and the input line 3-132 of the minimum duration memory circuit 3-70. As for the pulse applied to the trailing edge detector 3-112, this produces a trigger pulse at the end of the duration of the one-shot multivibrator 3-108. This duration is chosen to be sufficient to provide a well-defined output pulse from the sensor 3-10. In the example described, this pulse extends from the time $t_3$ to the time $t_5$. The output pulse will always have this exact duration. At the time $t_5$, a trigger spike (not shown) appears at the input 3-116 of the one-shot multivibrator 3-118, and this multivibrator puts out a rectangular pulse 3-172 shown in graph Q of FIG. 3B of sufficient length to discharge the pulse stretcher 3-26 by way of the line 3-124 and to short the integrator 3-58. This occurs after the processing of a particle pulse 3-30 has been completed and renders the sensor 3-10 ready to receive the next pulse.

The AND gate 3-130 will pass the rectangular signal 3-168 to the line 3-158 to open the analog gate 3-76 for the time $t_3$ to $t_5$ only if there is a signal at both of its input terminals 3-164 and 3-170. It has been demonstrated that the signal 3-168 will occur in every case on the line 3-170. It remains to be shown how the output from the integrator 3-58 appears on the line 3-68 and when compared to whatever signal appears on the line 3-172 in the comparator 3-150 may provide a signal on the line 3-164.

The signal 3-104 is a duration-measuring signal or pulse and the ramp and plateau pulse 3-126 is a signal or pulse whose amplitude is proportional to the time measured by the duration-measuring pulse 3-104. The amplitude of pulse 3-126 is an electrical quantity whose value is proportional to the time duration of the duration-measuring pulse 3-104. Accordingly, as taught by the co-pending applications, we may establish some electrical effect having a standard against which to compare the amplitude of the integrated pulse 3-126 by setting a threshold or voltage level which represents a duration equivalent to the maximum that we wish the sensor 3-10 to pass. This electrical effect could be, for example, the voltage level represented by the broken line 3-174 in graph M of FIG. 3B. Assume for the discussion that the broken line 3-174 is of constant amplitude. If this voltage obtains on the line 3-172 the terminals of the comparator 3-150 may be chosen so that there will be an output at 3-164 at all times except for the condition that the signal 3-126 appearing at 3-68 exceeds the level 3-174 in amplitude. Thus, the maximum level for comparison may be set by some manually adjusted threshold circuit as disclosed in the first of the co-pending applications or it may be done automatically, as disclosed in the second of the co-pending applications. The signal output at line 3-164 is represented by graph N of FIG. 3A. The elongate line 3-176 represents a continuous signal.

Illustrated in FIG. 3A is the minimum duration memory circuit 3-70 which is disclosed and explained in detail in the second co-pending application. Briefly, the input comparator 3-84 operates into terminal 3-86 of the AND gate 3-88 whose output 3-90 is applied to the shorting means of the integrator 3-92. A constant current supply 3-94 furnishes sufficient current to the integrator to exceed leakage and assure that the integrator drifts upward at a very slow rate. The slope of the broken lines 3-174 and 3-178 is exaggerated in graph M. The AND gate 3-88 receives on its input terminal 3-132 the pulse 3-168 from the one-shot multivibrator 3-108 after the leading edge or ramp of the pulse 3-126 has stopped increasing in amplitude. If at this time the voltage at 3-68 is less than the voltage at 3-144, the comparator 3-84 has an output at 3-86 which combines with the signal at 3-132 to produce an output at 3-90 which energizes the discharge means of the integrator 3-92 for a very short time, causing the voltage at the output 3-72 to decrease as shown at 3-180 in graph M. This output voltage at 3-72 is the lower broken line 3-178 of the graph M. When the voltage at 3-72 falls below the voltage at 3-68, the output from the comparator 3-84 disappears, removing the energizing signal from the AND gate 3-88 and from the shorting means of the integrator 3-92, thus causing the integrator output at 3-72 to hold at the new value which is the amplitude of the pulse 3-126. Until the next pulse, this value will remain, but slowly rising as the current supply 3-94 replenishes leakage.

The minimum duration memory circuit 3-70 will thus seek the amplitude of the integrated pulse 3-126 and will remember this amplitude until the next signal comes along. It therefore seeks the amplitude corresponding to the minimum duration pulses, and enables establishment of the maximum level against which to compare the pulse 3-126. This is attained by slightly amplifying the output 3-72 of the integrator 3-92 in the amplifier 3-180 and providing the resulting signal 3-174 on the line 3-172. The tolerance is represented by the difference between the two levels 3-174 and 3-178, as adjusted by the manual gain control 3-162.

So long as the pulse 3-126 does not exceed the level 3-174, there will be a signal at 3-164, the AND gate will have an output at 3-158 between the times $t_3$ and $t_5$, the gate 3-76 will be opened for the same time, and the output 3-78 will receive a pulse 3-184 as shown in graph R of FIG. 3B which has an amplitude X, the same as the amplitude of the stretched pulse 3-128 and of a fixed duration. The pulse 3-168 is in effect a strobing pulse which excises a portion of the stretched pulse 3-128 and permits this portion to pass to the terminal 3-78.

The next particle pulse which is to be processed is the pulse 3-34 which has been produced by the particle Y passing on the path 26 through the aperture 22 of FIG. 1. It has two peaks 36 and 38, the amplitude of the first of these peaks being Y as shown. In FIG. 3B, this pulse is designated 3-34 in graph A. Note that it has a greater duration than the pulse 3-30, and there is no assurance that the amplitude Y is proportional to the size of the particle that caused the same. It is therefore desired to disregard this pulse and not to open the gate 3-76 when it is strobed by a signal equivalent to the pulse 3-168.

The pulse 3-34 crossing the low threshold 3-32 generates the rectangular wave 3-186 between the times $t_6$ and $t_{11}$ as shown in graph C of FIG. 3B. This is the output of the comparator 3-28 appearing at 3-36, the input to the leading edge detector 3-42. In the same manner as described in connection with the processing of the pulse 3-30, the trigger spike 3-188 (graph F) is generated, to set the RS flip-flop 3-48 and produce the beginning of the rectangular wave 3-189 (graph G). In the meantime, the pulse 3-34 is differentiated in the differentiator 3-16 so that the differentiated wave 3-190 (graph B) appears at the line 3-50. Since the pulse 3-34 had two peaks, there will be three points of zero slope and these are represented at times $t_7$, $t_8$ and $t_9$ where the wave 3-190 crosses the base line. When the wave 3-190 is compared to ground 3-54 in the comparator 3-52, only the positive portions of the wave 3-190 result in outputs, these being the rectangular pulses 3-192 and 3-194. The trailing edge detector 3-62 generates the trigger spikes 3-196 and 3-198 at the times $t_7$ and $t_9$ (graph E) which are both applied to the reset input terminal of the RS flip-flop 3-48. The first trigger pulse 3-196 serves to reset the RS flip-flop 3-48 and the second trigger spike 3-198 has no effect because the flip-flop has already been reset by the spike 3-196. The resetting of the RS flip-flop 3-48 ends the generation of the rectangular wave 3-189 at the time $t_7$ and passing the wave 3-190 through the trailing edge detector 3-82 places a trigger spike 3-200 (graph H) at time $t_7$ on the line 3-98 which is the input to the second RS flip-flop 3-100.

From the above, it can be seen that the sensor responds only to the first peak of the wave 3-34, the signals produced by the second peak being ignored.

The particle pulse 3-34 is simultaneously applied to the pulse stretcher 3-26 and the comparator 3-46, and by the process described in connection with the pulse 3-30, the pulse 3-34 is attenuated in the attenuator 3-40, clipped in the clipper 3-134 and the resulting signal compared with the original pulse 3-34 in the comparator 3-46. The resulting signals are shown at 3-202 in graph I of FIG. 3B and at 3-204 in graph J. The output from the comparator 3-46 is the rectangular wave 3-206 of graph K whose leading edge is of no importance but whose trailing edge precisely marks the time $t_{10}$ that the trailing edge of the pulse 3-34 subsided to 50 percent of the amplitude Y. This pulse 3-206 passes through the trailing edge detector 3-102 to produce the spike 3-208 (graph O) which is applied by way of the line 3-101 to the reset terminal of the RS flip-flop 3-100 and to the input of the one-shot multivibrator 3-108.

The RS flip-flop 3-100 generates the duration-measuring signal 3-210 from the time $t_7$, which is the instant that the first peak of the particle pulse 3-34 occurs, to the time $t_{10}$ which is the half amplitude or the pulse 3-34. It is set by the trigger spike 3-200 and reset by the trigger spike 3-208.

The duration-measuring pulse 3-210 opens the analog gate 3-20 and the integrator 3-58 commences to generate the integrated pulse 3-212, the ramp of which rises linearly from time $t_7$ to time $t_{10}$ after which the plateau is generated. The integrator output 3-212 is shown in graph M, and it will be noted that the pulse 3-212 exceeds the maximum voltage level 3-174 from the time $t_x$ to the time $t_{12}$. From the description of the comparator 3-150 previously given, it can be seen that there will be no output from the comparator 3-150 appearing on the line 3-164 during the said period of time $t_x$ to $t_{12}$. This is represented by the negative rectangular pulse 3-214 in graph N. The strobing pulse 3-216 is generated as shown in graph P, and the discharging pulse 3-218 is generated as shown in graph Q, both in the same manner as described in connection with the processing of the pulse 3-30. Although the discharging pulse 3-218 serves to discharge the condensers of the pulse stretcher 3-26 and the integrator 3-58, the strobing pulse 3-216 has no effect upon the analog gate 3-76 because it occurs while the pulse 3-214 occurs. This latter pulse represents an absence of signal on the line 3-164, and so the eventual effect is that the pulse 3-34 does not produce any output at the terminal 3-78. The reason for this is that the duration from its peak to its half amplitude was greater than the maximum duration represented by the voltage 3-174.

It will be noted that the processing of the pulse 3-34 had no effect upon the minimum duration memory circuit which still continues to remember the duration of the last pulse processed to produce an output at 3-78.

Figure 4B:
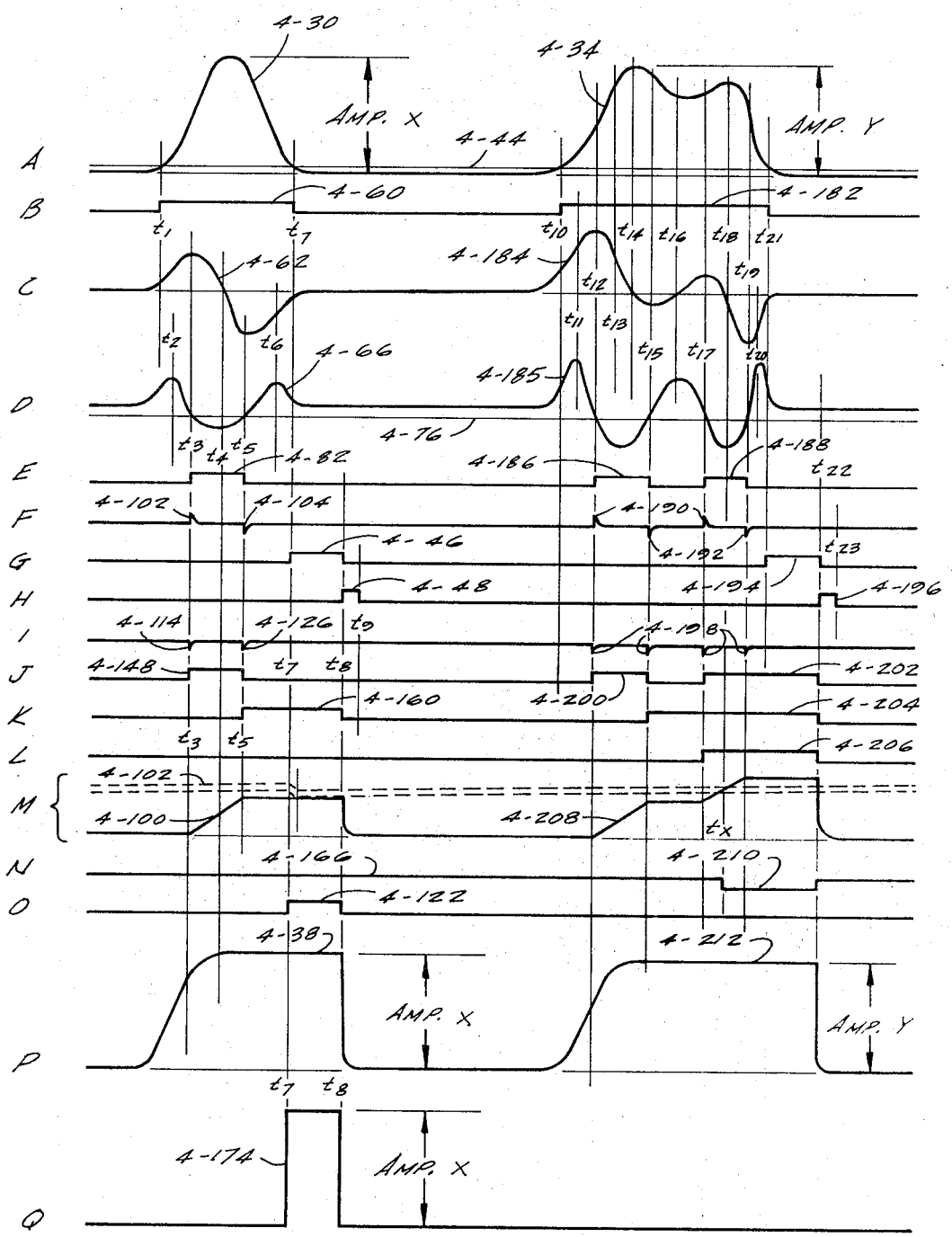
FIG. 4B is a diagram consisting of a series of graphs all on the same time scale illustrating various wave shapes throughout the sensor of FIG. 4A resulting from the processing of two particle pulses therein.

Attention is now invited to the circuit of FIG. 4A and the graphs of FIG. 4B. The illustrated sensor 4-10 is a modified form of the invention, and it operates on the principle of differentiating the particle pulses twice in order to find the points of minimum change of slope of the particle pulses, these points marking the maximum slope of the original pulse. Since a particle pulse having more than one peak is anomalous, means are provided in the circuit for discarding any such pulses, even if their durations are within the criterion of duration established by the minimum duration memory circuit.

The two particle pulses which will be considered again are substantially the same as those which were respectively produced by the particles X and Y on the paths 24 and 26 of FIG. 1. These pulses are designated 4–30 and 4–34 in FIG. 4B, and they are both applied to the input terminal 4–12 of the sensor 4–10. First, the pulse 4–30 will be processed and such processing explained.

The pulse 4–30 is applied to the pulse stretcher 4–26 which produces the stretched pulse 4–38 of graph P of FIG. 4B having its leading edge the same as the leading edge of the pulse 4–30 but having a flattened top which is at the same amplitude as the maximum amplitude of the pulse 4–30, the duration of this pulse 4–38 being controlled by means supplying a discharge signal to the pulse-stretcher 4–26 as will be explained hereinafter.

At the same time the particle pulse is applied to the low threshold circuit 4–32 which is for suppressing noise and to provide a trigger signal to the strobing one-shot 4–108. The threshold is established by the voltage source 4–22 and the variable resistor 4–24 providing one input 4–20 to the comparator 4–28, the other terminal being the line 4–14 from the input terminal 4–12. The threshold for noise is shown in graph A of FIG. 4B exaggerated at 4–44. A signal comprising a rectangular wave will appear at 4–36 all the time that the input particle pulse 4–30 exceeds the noise threshold 4–44, this signal comprising the pulse 4–60 of graph B of FIG. 4B between the times $t_1$ and $t_7$. The trailing edge detector 4–42 produces a trigger spike (not shown) at the time $t_7$ and applies this trigger spike by way of the line 4–54 to the strobing one-shot multivibrator 4–108, the latter putting out the strobing pulse 4–46 shown in the graph G between the times $t_7$ and $t_8$. This strobing pulse is applied by way of the line 4–170 to one of the inputs to the veto-AND gate 4–130 and by way of the line 4–110 to another trailing edge detector 4–112. This detector produces a trigger spike (not shown) at the time $t_8$ which is applied to the reset one-shot multivibrator 4–118 by way of the line 4–116, and a reset pulse 4–48 (graph H of FIG. 4B) is produced between the times $t_8$ and $t_9$. This pulse is used to discharge the pulse stretcher 4–26, to reset the integrator 4–58 and to reset two toggle flip-flops which will be described. The connecting line for the reset functions is designated 4–120.

The incoming particle pulse 4–30 is also applied to the first differentiator 4–16 which differentiates the pulse 4–30 to produce the wave 4–62 shown in graph C between slightly before the time $t_1$ and slightly after the time $t_7$. This signal represents the slope of the particle pulse 4–30, and hence it has a peak at time $t_3$, the point of maximum slope of the leading edge of the pulse 4–30, a zero-crossing at the time $t_4$ which is the peak or zero slope condition of the pulse 4–30, and it has another peak at time $t_5$ which is the point of maximum slope of the trailing edge of the particle pulse 4–30. This pulse is amplified in the amplifier 4–40 without changing its relation to time and then applied to a second differentiator 4–18. The output of the differentiator 4–18 is the differential of the wave 4–62 which appears at 4–64 and is shown as 4–66 in graph D of FIG. 4B. The first differential of the wave 4–62 is the second differential of the wave 4–30, hence the wave 4–66 represents the rate of change of the slope of the wave 4–30. The minimum rate of change occurs at the maximum slope on the leading and trailing edges of the pulse 4–30, hence there will be a zero crossing at the times of the peaks of the wave 4–62, namely, at the times $t_3$ and $t_5$.

The differentiator 4–18 operates into a low threshold circuit 4–74 which operates to suppress noise. The threshold 4–76 is established by the voltage source 4–78 and the voltage divider 4–80 and, as noted, it is below ground. The comparator 4–52 is thus constructed and arranged to produce an output only when the wave 4–66 drops below the noise threshold 4–76, and this occurs at the times $t_3$ and $t_5$, or quite close thereto. The peak of the particle pulse 4–30 is a zero crossing in the wave 4–62 and is a negative peak at $t_4$ in the wave 4–66. The output of the comparator 4–52 appears at 4–80 in the form of a rectangular pulse shown at 4–82 in the graph E. This rectangular pulse constitutes the duration-measuring signal of the sensor 4–10 since it measures the time between the points of maximum slope on the leading and trailing edges of the particle pulse 4–30.

The rectangular pulse 4–82 is applied to the integrator 4–58 and by way of the line 4–96 to another differentiator 4–98. In the integrator 4–58, the rectangular duration-measuring signal 4–82 is used in the manner described previously, producing a ramp and pedestal pulse 4–100 shown in graph M of FIG. 4B. From the time $t_3$ to the time $t_5$, the amplitude rises linearly, integrating the rectangular pulse 4–82. From the time $t_5$ onward, the integrator retains its charge so that the pedestal is formed, this being at an amplitude which is proportional to the duration of the pulse 4–82, and hence also proportional to the duration of the pulse 4–30 between its points of maximum slope on its leading and trailing edges. Since the integrator 4–58 is one of the components reset by the reset one-shot 4–118, its charge subsides at the period commencing with the time $t_8$ on account of the influence of the reset signal 4–48.

The integrated pulse 4–100 is compared with the maximum threshold level 4–102 in the comparator 4–150 and since it does not exceed this level, there is no change in the signal appearing on the line 4–164 which is one of the terminals of the veto-AND gate 4–130. The operation of the minimum duration memory circuit 4–70 is as explained in connection with the equivalent circuit 3–70 of FIG. 3A except that the AND gate 4–88 receives its lower input from the line 4–158, the output from the veto-AND gate 4–130. This latter signal is a rectangular wave 4–122 shown in graph O.

The rectangular duration-measuring signal 4–82 is differentiated in the differentiator 4–98 and puts out positive and negative trigger pulses 4–102 and 4–104 (graph F) which are converted to negative trigger pulses 4–114 and 4–126 (graph I) in the rectifier 4–128. These trigger pulses are applied to the lower terminal 4–132 of the veto-AND gate 4–134 and, if passed, are applied to the first toggle flip-flop 4–136. Each of the trigger spikes 4–114 and 4–126 indicates a zero crossing of the wave 4–66 which corresponds to maximum slope instances of the original pulse 4–30.

Both of the toggle flip-flops 4–136 and 4–137 have previously been reset to zero so that no signals appear on the paths 4–138 and 4–140 between pulses. Under these circumstances, there is no signal, or zero logic on the line 4–142 and the line 4–146 leading to the veto input of the AND gate 4–130. Likewise, there is no veto signal on the veto terminal of the veto-AND gate 4–134, so that trigger pulses can be received on the line 4–132. The first spike 4–114 toggles the flip-flop 4-136, producing an output in the form of a rectangular wave 4-148 shown in graph J which starts at the first trigger pulse at time $t_3$ and ends at the second trigger pulse at the time $t_5$. At the occurrence of the second trigger pulse, the trailing edge detector 4-152 produces a trigger spike (not shown) which triggers the toggle flip-flop 4-137 so that there is an output from it on the line 4-140. This consists of a rectangular pulse 4-160 (graph K) that starts at the time $t_5$ and ends at the time $t_8$ when the toggle flip-flops are reset. Thus, there is a logic one signal on the upper input of the AND gate 4-154 but no signal or a logic zero on the lower input to this AND gate. The strobing pulse 4-122 (Graph O) commences at the time $t_7$ and ends at the time $t_8$. During this period of time, there is no veto signal on the line 4-146 because there were only two zero crossings of the second differentiated wave 4-66, signifying a substantially perfect pulse 4-30. As explained, there is a signal on the line 4-164 as represented by the absence of veto signal at 4-166 in graph N, and there is the strobing signal 4-46 on the line 4-170. Since all conditions for passing a signal through the veto-AND gate 4-130 are met, the signal 4-122 appears at the line 4-158, opening the analog gate 4-176 and permitting a portion of the stretched pulse 4-38 to pass to the terminal 4-178 between the times $t_7$ and $t_8$. This output signal comprises the derived pulse 4-174 of graph Q.

From the above, it appears that there are two criteria for obtaining an output, the first of which is the same as before with respect to the maximum level against which the integrated pulse is compared, and the second of which is an additional criterion which depends upon the number of crossings of the second derivative of the original particle pulse 4-30. This will be discussed in more detail below, in connection with the processing of a multipeak pulse such as 4-34 in the sensor 4-10. For the moment, it should be appreciated that even though the duration between the points of maximum slope on the leading and trailing edges of a pulse meet the first criterion, it is possible that the existence of more than one peak indicates an anomalous pulse and hence such pulse should be discarded. It is for this reason that the second criterion has been built into the sensor 4-10.

Considering now the pulse 3-34, when it is passed through the comparator 4-28, it generates the rectangular wave 4-182 between the times $t_{10}$ and $t_{21}$, the trailing edge of the wave 4-182 initiating the strobing pulse 4-194 between the times $t_{21}$ and $t_{22}$, and the reset pulse 4-196 between the times $t_{22}$ and $t_{23}$. The first derivative of the pulse 4-34 comprises the wave 4-184 which has two positive peaks at $t_{12}$ and $t_{17}$, a negative peak at $t_{15}$, and three zero crossings, at $t_{14}$, $t_{16}$ and $t_{18}$. The second derivative wave 4-185 has four zero crossings at $t_{12}$, $t_{15}$, $t_{17}$, and at $t_{19}$. As a result, the output of the comparator 4-52 comprises two rectangular pulses 4-186 and 4-188 shown at graph E.

The two rectangular pulses 4-186 and 4-188 together comprise the duration-measuring signal which consists of two parts because the pulse 4-34 has two peaks, there being four points of maximum slope. This compound signal is integrated in the integrator 4-58 and produces the double pedestal pulse 4-208. There is a first ramp between the times $t_{12}$ and $t_{15}$ corresponding to the rectangular pulse 4-186; a lower pedestal or plateau portion which remains at the maximum amplitude reached by the first ramp from the time $t_{15}$ to the time $t_{17}$; a second ramp between the times $t_{17}$ and $t_{19}$ corresponding to the rectangular pulse 4-188; and a second pedestal portion between the times $t_{19}$ and $t_{22}$. The pulse 4-208 exceeds the upper limit threshold 4-102 from the time $t_x$ (which is somewhere between the times $t_{17}$ and $t_{19}$) to the time $t_{22}$ and therefore, the line 4-164 will have no signal. This is the equivalent of a veto signal 4-210 shown in graph N. Thus, regardless of what appears on the lines 4-170 and 4-146, there will be no signal at 4-158 and the gate 4-176 will not open.

Assume for the moment that the duration of the signal composed of the two rectangular pulses 4-186 and 4-188 is such that the integrated signal 4-208 does not exceed the threshold 4-102. In such case, there are two or more peaks to the pulse 4-34 which means that the amplitude is not a true measure of the size of the particle causing the pulse. It is desired not to pass this pulse through the sensor 4-10, notwithstanding that its duration is substantially that of a desirable pulse. This is accomplished by the circuitry in the lower right-hand corner of the block diagram.

The two rectangular pulses 4-186 and 4-188 produce the positive and negative trigger spikes 4-190 and 4-192 which are shown in graph F after passing through the differentiator 4-98. These spikes are converted into negative spikes 4-198 by the rectifier and then pass to the toggle flip-flops 4-136 and 4-137 through the veto-AND gate 4-134. At first there is no output from the flip-flop 4-137 or 4-136 so that there is no output on line 4-140, on the line 4-138, on the line 4-142 or on the line 4-146. At the time $t_{12}$ the first trigger spike arrives and toggles the flip-flop 4-136 to produce the start of the rectangular pulse 4-200 of graph J. The second trigger spike arrives at the time $t_{15}$ and it completes the pulse 4-200. In this period of time there was an output or logic one on line 4-138, but no output, i.e., a logic zero on the line 4-140, so that the condition described before the arrival of the first trigger spike still obtains. As soon as the second trigger spike 4-198 arrives, there is no longer a signal at the line 4-138 but the rectangular pulse 4-204 commences. There is still no signal on the lines 4-142 and 4-146. As soon as the third trigger spike 4-198 arrives, at the time $t_{17}$, it starts a second period or signal output from the first toggle flip-flop 4-136, represented by the rectangular wave 4-202. This does not affect the trailing edge detector 4-152 unitl the time $t_{22}$, and so, for the period of time from $t_{17}$ until the time $t_{22}$ there are signals on the lines 4-138 and 4-140. The AND gate 4-154 produces a signal represented by the veto pulse 4-206 of graph L and this blocks the further receipt of trigger spikes through the gate 4-134 while at the same time vetoing the AND gate 4-130 and preventing it from passing the strobing signal 4-194. Accordingly, there will be no output at the terminal 4-178 because the analog gate 4-176 was not opened.

It should be noted that the receipt of three trigger spikes by the toggle flip-flops is sufficient to block the advent of further trigger spikes to give the circuit the chance to veto the strobing pulse.

The sensor 4-10 will reject particle pulses which have only one peak but too long a duration. The manner in which this is done depends upon the criterion established by the minimum duration memory circuit 4-70.

The invention is also directed to the method of discriminating between different types of desirable and undesirable pulses.

Variations can be made in the circuitry without departing from the spirit or scope of the invention as defined in the appended claims.

What it is desired to secure by Letters Patent of the United States is:

1. An axial trajectory sensor for use with a Coulter type particle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration; said sensor acting to respond to said desirable particle pulses and not to respond to said other pulses and comprising:

A. input terminal means and output terminal means having a channel for passage of electrical signals between the terminal means with gate means in said channel to control the signals which appear at the output terminal means, the input terminal means adapted to have said desirable and other particle pulses applied thereto,
   B. means for measuring the duration of a portion of a particle pulse applied to said input terminal means and deriving a duration-measuring pulse of constant amplitude and having the measured duration,
      i. said portion comprising the extent of particle pulse between one of the first-occuring maximum and minimum slopes on the leading edge of the pulse and
      ii. extending to a predetermined part of the trailing edge of the pulse,
   C. means for converting said duration measuring pulse into an electrical quantity whose value is proportional to the time duration of said duration-measuring pulse,
   D. means for establishing an electrical effect of a standard equivalent to a maximum desired duration distinguishing between quantities produced by desirable and other pulses,
   E. means comparing said quantity with said standard and providing a first type of energizing signal if the quantity does not exceed the standard and a second type of signal if the quantity does exceed the standard, and
   F. means for applying one of said energizing signals to the gate means in said channel to permit passage to said output terminal means of only electrical signals derived from desirable particle pulses.

2. The axial trajectory sensor as claimed in claim 1 in which means are provided to close said gate means irrespective of the application of an energizing signal to open said gate means in the event that a particle pulse has two points of zero slope.

3. The axial trajectory sensor as claimed in claim 1 in which the portion comprising the extent of the particle pulse commences at the first-occurring minimum slope of the leading edge and said measuring means include means for locating said first-occurring minimum slope.

4. The axial trajectory as claimed in claim 3 in which said locating means comprise a differentiator for differentiating said particle pulse once.

5. The axial trajectory sensor as claimed in claim 3 in which the predetermined part of the trailing edge at which said portion terminates is the point at which said trailing edge subsides to a predetermined fraction of the amplitude of the particle pulse and said measuring means include means for locating said point.

6. The axial trajectory sensor as claimed in claim 5 in which said locating means comprise a pulse stretcher and attenuator connected to provide a stretched attenuated signal and means for comparing the attenuated signal with said particle pulse.

7. The axial trajectory sensor as claimed in claim 6 in which the means for locating the first-occurring minimum slope comprise a differentiator for differentiating said particle pulse once.

8. The axial trajectory sensor as claimed in claim 1 in which the portion comprising the extent of the particle pulse commences at the first-occurring maximum slope of the leading edge and said measuring means include means for locating said first-occurring maximum slope.

9. The axial trajectory sensor as claimed in claim 8 in which said locating means comprise circuitry for differentiating said particle pulse to obtain a second differential thereof.

10. The axial trajectory sensor as claimed in claim 9 which includes means responsive to said differentiating circuitry to produce a train of signals for each particle pulse which is characteristic of the number of peaks of said particle pulse, and means for responding to the train of signals to close the gate means any time that a train of pulses signifies the presence of a particle pulse having more than one peak.

11. The axial trajectory sensor as claimed in claim 8 in which the predetermined part of the trailing edge at which said portion terminates is the point of maximum slope thereof and said measuring means include means for locating said point.

12. The axial trajectory sensor as claimed in claim 11 in which said point locating means and said means for locating the first-occurring maximum slope are the same.

13. The axial trajectory sensor as claimed in claim 11 in which said point locating means and said means for locating the first-occurring maximum slope are the same and comprise circuitry for differentiating said particle pulse to obtain a second differential thereof.

14. An axial trajectory sensor for use with a Coulter type particle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration; said sensor acting to respond to said desirable particle pulses and not to respond to said other pulses and comprising:

A. input terminal means and output terminal means having a channel for passage of electrical signals between the terminal means with switch means in said channel to control the signals which appear at the output terminal means, the input terminal means adapted to have said desirable and other particle pulses applied thereto, B. means for measuring the duration of a portion of a particle pulse applied to said input terminal means and deriving a duration-measuring pulse of constant amplitude and having the measured duration,
   i. said portion comprising the extent of the particle pulse between one of the first-occurring maximum and minimum slopes on the leading edge of the pulse and
   ii. extending to a predetermined part of the trailing edge of the pulse, C. means for converting said duration-measuring pulse into an electrical time signal pulse whose amplitude is proportional to the duration of said duration-measuring pulse, D. means for establishing a voltage level representative of the amplitude equivalent to the maximum duration of desirable particle pulses, E. means comparing the amplitude of said electrical time signal with said voltage level and providing a first type of energizing signal if said amplitude does not exceed said level and a second type of energizing signal if the amplitude exceeds said level, F. gating means provided between the comparing means and the switch means, G. strobing pulse producing means connected with said switch means and coupled with said duration-measuring means to produce a strobing pulse at said gating means in timed relation to a particle pulse applied to said input terminal means, H. means for applying all particle pulses through said channel to said switch means in synchronized relation with said strobing pulse, I. means for applying said energizing signals to said gating means, said gating means being constructed to pass said strobing pulse to operate said switch means to signal-passing condition only when said first type of energizing signal is applied to said gating means, whereby said switch means will be activated to pass particle pulses whose duration is less than said maximum duration.

15. The axial trajectory sensor as claimed in claim 14 in which means are provided to close said gating means irrespective of the application of an energizing signal to open said gating means in the event that a particle pulse has two points of zero slope.

16. The axial trajectory sensor as claimed in claim 14 in which the portion comprising the extent of the particle pulse commences at the first-occurring minimum slope of the leading edge and said measuring means include means for locating said first-occurring minimum slope.

17. The axial trajectory as claimed in claim 16 in which said last-mentioned means comprise a differentiator for differentiating said particle pulse once.

18. The axial trajectory sensor as claimed in claim 16 in which the predetermined part of the trailing edge at which said portion terminates is the point at which said trailing edge subsides to a predetermined fraction of the amplitude of the particle pulse and said measuring means include means for locating said point.

19. The axial trajectory sensor as claimed in claim 18 in which said locating means comprise a pulse stretcher and attenuator connected to provide a stretched attenuated signal and means for comparing the attenuated signal with said particle pulse.

20. The axial trajectory sensor as claimed in claim 19 in which the means for locating the first-occurring minimum slope comprise a differentiator for differentiating said particle pulse once.

21. The axial trajectory sensor as claimed in claim 14 in which the portion comprising the extent of the particle pulse commences at the first-occurring maximum slope of the leading edge and said measuring means include means for locating said first-occurring maximum slope.

22. The axial trajectory sensor as claimed in claim 21 in which said locating means comprise circuitry for differentiating said particle pulse to obtain a second differential thereof.

23. The axial trajectory sensor as claimed in claim 22 which includes means responsive to said differentiating circuitry to produce a train of signals for each particle pulse which is characteristic of the number of peaks of said particle pulse, and means for responding to the train of signals to close the gate means any time that a train of pulses signifies the presence of a particle pulse having more than one peak.

24. The axial trajectory sensor as claimed in claim 21 in which the predetermined part of the trailing edge at which said portion terminates is the point of maximum slope thereof and said measuring means include means for locating said point.

25. The axial trajectory sensor as claimed in claim 24 in which said point locating means and said means for locating the first-occurring maximum slope are the same.

26. The axial trajectory sensor as claimed in claim 24 in which said point locating means and said means for locating the first-occurring maximum slope are the same and comprise circuitry for differentiating said particle pulse to obtain a second differential thereof.

27. A sensor for use with a Coulter type particle analyzing apparatus in which particles passing through an aperture produce desirable pulses each having a single peak and whose amplitudes are most nearly proportional to their respective sizes and undesirable pulses each having multiple peaks and whose amplitudes are not necessarily proportional to their respective sizes; said sensor acting to respond to said desirable particle pulses and not to respond to the other pulses and comprising:

A. Input terminal means and output terminal means having a channel for passage of electrical signals between the terminal means with switch means in the channel to control the signals which appear at the output terminal means, the input terminal means adapted to have the desirable and other particle pulses applied thereto, B. gating means for operating said switch means, C. means connected with said input terminal means for counting the number of peaks in any incoming particle pulse and producing a first type of energizing signal if there is one peak and a second type of signal if there is more than one peak in said pulse, and D. a connection from said last means to said gatng means for applying said energizing signals thereto, the gating means being responsive to said first type of energizing signal to operate said switch means to pass the pulse to said output terminal means and responsive to said second type of energizing signal to render said switch means inoperative.

28. The sensor as claimed in claim 27 in which said counting means include a circuit for obtaining a second differential of said incoming pulse, a circuit for counting the number of zero crossings of the base line of said second differential and producing a train of pulses characteristic of said number, and a counter responsive to said train of pulses and producing said first type of energizing signal only when said train of pulses comprises two pulses, and said second type of energizing signal when said train contains more than two pulses.

29. The method of sensing between the particle pulses caused by particles passing through a Coulter particle apparatus aperture on axis of the aperture and off the axis of the aperture, which comprises:
   A. measuring the duration of that portion of the particle pulse which falls between one of the minimum and maximum slopes of the leading edge and a predetermined point on the trailing edge of the pulse and deriving therefrom a duration-measuring pulse of constant amplitude and having said duration,
   B. converting the duration-measuring pulse into a signal whose amplitude is proportional to said duration,
   C. establishing a signal level which represents the maximum duration of a duration-measuring pulse for desirable pulses,
   D. comparing the signal with the signal level and obtaining an energizing signal of a first type if the signal level is not exceeded and a second type if the signal level is exceeded,
   E. deriving an electrical signal from each said particle pulse, and
   F. passing or blocking said derived signals on the basis of whether they have respectively produced energizing signals of the first or second type.

30. The method as claimed in claim 29 in which the measuring step includes measuring the duration from the minimum slope of the leading edge.

31. The method as claimed in claim 29 in which the measuring step includes measuring the duration from the maximum slope of the leading edge.

32. The method as claimed in claim 29 in which the measuring step includes measuring the duration from the minimum slope of the leading edge to a fractional amplitude on the trailing edge.

33. The method as claimed in claim 29 in which the measuring step includes measuring the duration from the maximum slope of the leading edge to the maximum slope of the trailing edge.

34. The method as claimed in claim 29 in which the measuring step includes deriving the first differential of the pulse so that the zero-crossing thereof marks the point of minimum slope of the leading edge.

35. The method as claimed in claim 33 in which the measuring step includes deriving the second differential of the pulse so that the first and last zero-crossings identify the points of maximum slope on the leading and trailing edges of said pulse.

36. An axial trajectory sensor for use with a particle study apparatus in which particles pass through a detecting zone having an axis for producing particle pulses, the particles, when passing closest to an axial trajectory through the detecting zone, producing desirable particle pulses having amplitudes which are most nearly proportional to the respective sizes of the particles, and also thereby having a certain approximate duration, and in which particles passing through the detecting zone on trajectories displaced from its axis will produce other particle pulses having amplitudes which are not necessarily proportional to their respective sizes and having durations which tend to be longer than said certain approximate duration; said sensor being constructed with an input and arranged to respond to said desirable particles pulses in a first manner and to respond to said other particles pulses in a second manner and comprising:
   A. means for measuring the duration of a portion of a particle pulse applied to the sensor input and for deriving a duration-measuring pulse having the measured duration, said pulse portion comprising the extent of the particle pulse lying between one of the first-occurring maximum and minimum slopes on the leading edge of the pulse and extending to a predetermined part of the trailing edge of the pulse;
   B. means for establishing an electrical standard equivalent to a maximum desired duration for the duration-measuring pulses;
   C. means for comparing each said duration-measuring pulse with said standard and for providing a first type of energizing signal if said standard is not exceeded and a second type of signal if said standard is exceeded, and
   D. means coupled to receive said first and second types of signals for generating, respectively, the first and second manners of response.

* * * * *

UNITED STATES PATENT OFFICE
CERTIFICATE OF CORRECTION

Patent No. 3,783,391      Dated January 1, 1974

Inventor(s) Walter R. Hogg et al

It is certified that error appears in the above-identified patent and that said Letters Patent are hereby corrected as shown below:

Column 7, line 42, change "2-50" to --3-50 --, Column 11, line 59, change "3-190" to -- 3-189 --, Column 16, line 49, change "unitl" to -- until --, Column 19, line 62, change "last-mentioned" to -- locating --.

Signed and sealed this 3rd day of December 1974.

(SEAL)
Attest:

McCOY M. GIBSON JR.
Attesting Officer

C. MARSHALL DANN
Commissioner of Patents